United States Patent [19]

King

[11] Patent Number: 4,473,998

[45] Date of Patent: Oct. 2, 1984

[54] GAS TURBINE ENGINES

[75] Inventor: Peter R. King, Derby, England

[73] Assignee: Rolls-Royce Limited, London, England

[21] Appl. No.: 504,307

[22] Filed: Jun. 14, 1983

[30] Foreign Application Priority Data

Jun. 30, 1982 [GB] United Kingdom ............... 8218879

[51] Int. Cl.³ .............................................. F02G 3/00
[52] U.S. Cl. ............................. 60/39.091; 74/577 S; 415/118; 415/122 R
[58] Field of Search .......................... 60/39.091, 39.75; 74/577 R, 577 S; 415/9, 122 R, 118; 137/38, 45

[56] References Cited

U.S. PATENT DOCUMENTS

| 1,220,052 | 3/1917 | Alpern | 415/9 |
| 2,886,300 | 5/1959 | Haworth et al. | 60/39.091 X |
| 2,930,188 | 3/1960 | Haworth et al. | 60/39.091 |
| 2,930,189 | 3/1960 | Petrie | 60/39.091 |
| 3,050,939 | 8/1962 | Morley | 60/39.091 |
| 4,150,566 | 4/1979 | Loebel et al. | 73/862.34 |

FOREIGN PATENT DOCUMENTS 2002857 2/1979 United Kingdom ............ 60/39.091

Primary Examiner—Louis J. Casaregola
Assistant Examiner—Donald E. Stout
Attorney, Agent, or Firm—Cushman, Darby & Cushman

[57] ABSTRACT

A detection means to detect when a relative angular displacement between a first shaft and a second shaft of a gas turbine engine reaches a predetermined value comprises an aperture in the first shaft and a cooperating ratchet device attached to the second shaft. An arm of the ratchet device abuts the circumference of the first shaft, and the aperture in the first shaft is initially positioned a predetermined angle in the direction of rotation of the shafts from the arm. In operation when the relative angular displacement between the shafts reaches the predetermined value the arm of the ratchet device aligns with and moves into the aperture in the first shaft.

The ratchet device has a pawl which moves radially outwards from the shaft and engages with and displaces a lever when the arm moves into the aperture. The displacement of the lever may be used to shut off the supply of fuel to the gas turbine engine or to operate an indication means.

12 Claims, 10 Drawing Figures

GAS TURBINE ENGINES

The present invention relates to gas turbine engines, and in particular it relates to means for detecting when the torque applied to a torque carrying shaft reaches a predetermined value. It is also concerned with a means to shut off a supply of fuel to the gas turbine engine when the torque applied to the torque carrying shaft reaches the predetermined value, or a means to indicate to a flight deck of an aircraft to which the gas turbine engine is mounted when the torque applied to the torque carrying shaft has reached the predetermined value.

Gas turbine engines comprise one or more torque carrying shafts which drivingly connect a fan or a compressor rotor to one or more corresponding driving turbine rotor/rotors. These torque carrying shafts may be rotating at speeds in excess of 11000 RPM, and should one of these shafts fail the corresponding turbine will accelerate rapidly due to the removal of the load being driven. If the acceleration of the unloaded turbine is not prevented, the turbine will overspeed and the turbine may burst and cause serious damage to the gas turbine engine.

The present invention seeks to provide means to detect when the torque applied to a shaft reaches a predetermined value.

The invention also seeks to provide means to shut off a supply of fuel to the gas turbine engine when the torque applied to the shaft reaches the predetermined value.

The invention further seeks to provide means to indicate to the flight deck of the aircraft on which the gas turbine is mounted when the torque applied to the shaft reaches the predetermined value.

Accordingly the present invention provides a gas turbine engine which comprises a first shaft positioned coaxially within a second shaft, one of the shafts drivingly connects a first rotating assembly to a second rotating assembly, a means to detect when a relative angular displacement between the shafts reaches a predetermined value when the gas turbine engine is in operation, said means comprises at least one aperture in the first shaft and a corresponding ratchet device mounted on a spindle which is attached to the second shaft, the ratchet device has an arm positioned at one end which abuts the outer circumference of the first shaft, the aperture in the first shaft lies in the same plane as the ratchet device and the aperture in the first shaft is angularly spaced in the direction of rotation of the shafts from the arm of the ratchet device, in operation when the relative angular displacement between the first and second shaft reaches the predetermined value the arm of the ratchet device aligns with the aperture in the first shaft and the arm moves into the aperture.

The first shaft may have a plurality of equi-spaced apertures and the second shaft may have an equal number of equi-spaced ratchet devices mounted on spindles, the apertures in the first shaft and the ratchet devices lying in the same plane and each aperture in the first shaft being positioned a predetermined angle in the direction of rotation of the shafts from the arm of a corresponding ratchet device, in operation when the relative angular displacement between the first and second shafts reaches the predetermined value the arm of each ratchet device aligns with and moves into the corresponding aperture in the first shaft.

Each ratchet device may have a pawl positioned at the opposite end to the arm, an operating means is spaced radially outwards from the pawl, in operation when the arm of each ratchet device moves into the corresponding aperture in the first shaft each ratchet device rotates about its spindle and each pawl moves radially outwards, as the shafts rotate one of the pawls engages with and causes displacement of the operating means.

In one embodiment the second shaft drivingly connects the first rotating assembly to the second rotating assembly, the first shaft extends the full length of the second shaft and the first shaft is secured to the upstream end of the second shaft, the apertures in the first shaft and the corresponding ratchet devices are positioned at the downstream end of the first and second shafts respectively, in operation the twisting of the second shaft causes the downstream end of the second shaft to be angularly displaced relative to the downstream end of the first shaft.

In a further embodiment the first shaft drivingly connects the first rotating assembly to the second rotating assembly, at least one weight is positioned radially between and is attached to the first and second shafts respectively, the weight is attached to the first and second shafts by a pair of links which allow the weight to move in a radial direction, in operation the weight moves radially outwards and causes the second shaft to be angularly displaced relative to the first shaft.

The displacement of the operating means may cause a supply of fuel to the gas turbine engine to be reduced or terminated.

The displacement of the operating means may cause the operation of an indication means which indicates that the relative angular displacement between the shafts has reached the predetermined value.

The operating means may be a lever or a cable.

The invention will be more fully described with reference to the accompanying drawings in which.

Figure 1:
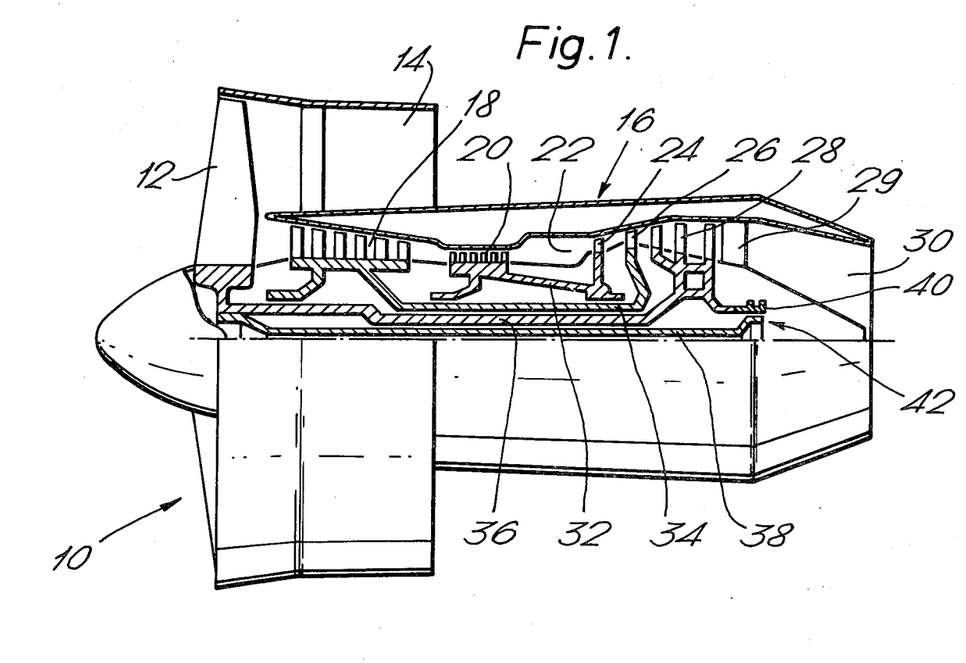
FIG. 1 is a diagrammatic view of a gas turbine engine according to the present invention which is partially cut away to show one embodiment of the rotating assemblies, the shafts and the means to detect when a relative angular displacement between the shafts reaches a predetermined amount when the gas turbine engine is in operation.
Figure 2:
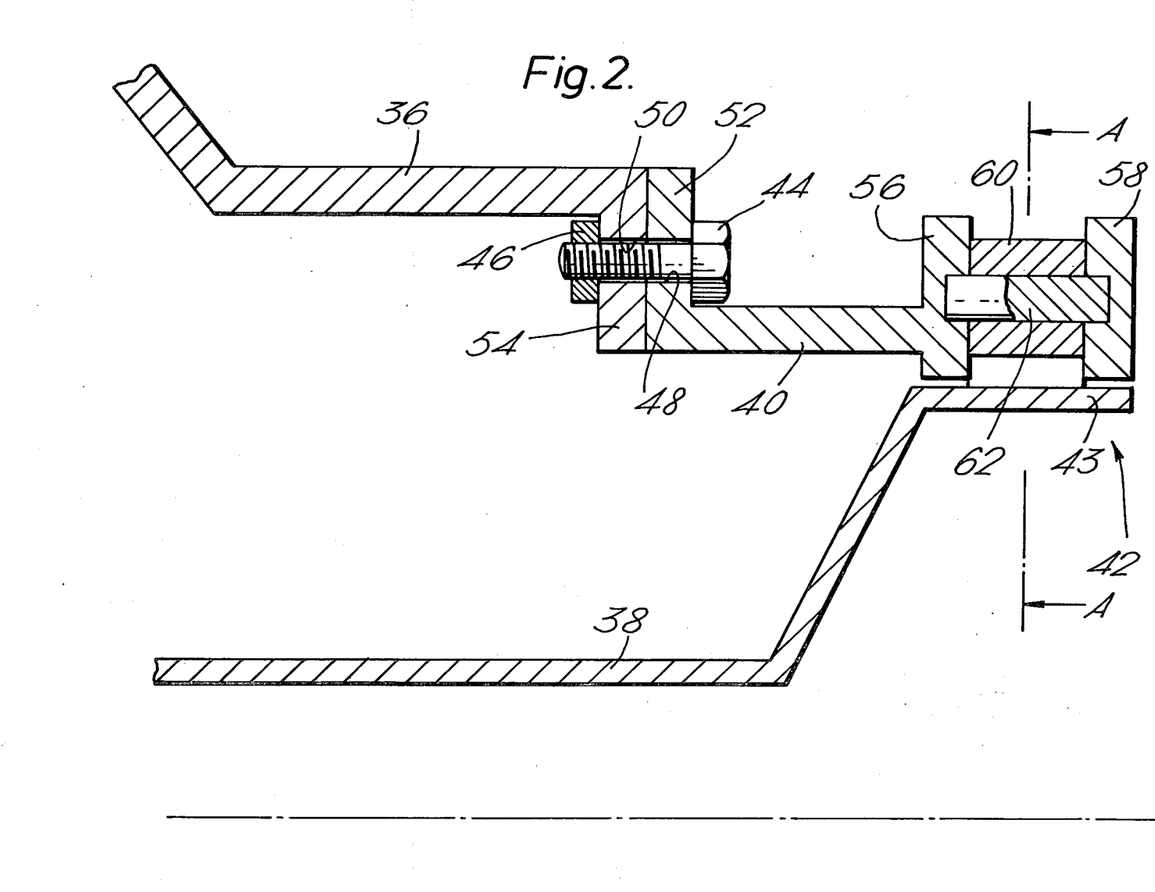
FIG. 2 is an enlarged view of the low pressure shaft and a shaft positioned coaxially within the low pressure shaft and the detecting means as shown in FIG. 1.

A gas turbine engine 10 as shown in FIG. 1 comprises in flow series a fan 12 and a core engine 16. The core engine 16 comprises in flow series an intermediate pressure compressor 18, a high pressure compressor 20, an annular combustion chamber 22, a high pressure turbine 24, an intermediate pressure turbine 26, a low pressure turbine 28 and an exhaust nozzle 30. A number of struts 29 provide support for the core engine 16. An annular bypass duct 14 is formed around the core engine 16, and the fan 12, the intermediate and high pressure compressors 18 and 20 respectively are connected to the low, intermediate and high pressure turbines 28, 26 and 24 respectively via the low, intermediate and high pressure shafts 36, 34 and 32 respectively. A shaft 38 is positioned coaxially within and is secured to the upstream end of the low pressure shaft 36 and extends the full length of the low pressure shaft 36, and the downstream end of the shaft 38 is not secured to the downstream end of the low pressure shaft 36. A detection means 42 to detect when a relative angular displacement between the shafts 36 and 38 reaches a predetermined amount when the gas turbine engine is in operation is positioned at the downstream end of the shafts 36 and 38.

Figure 3A:
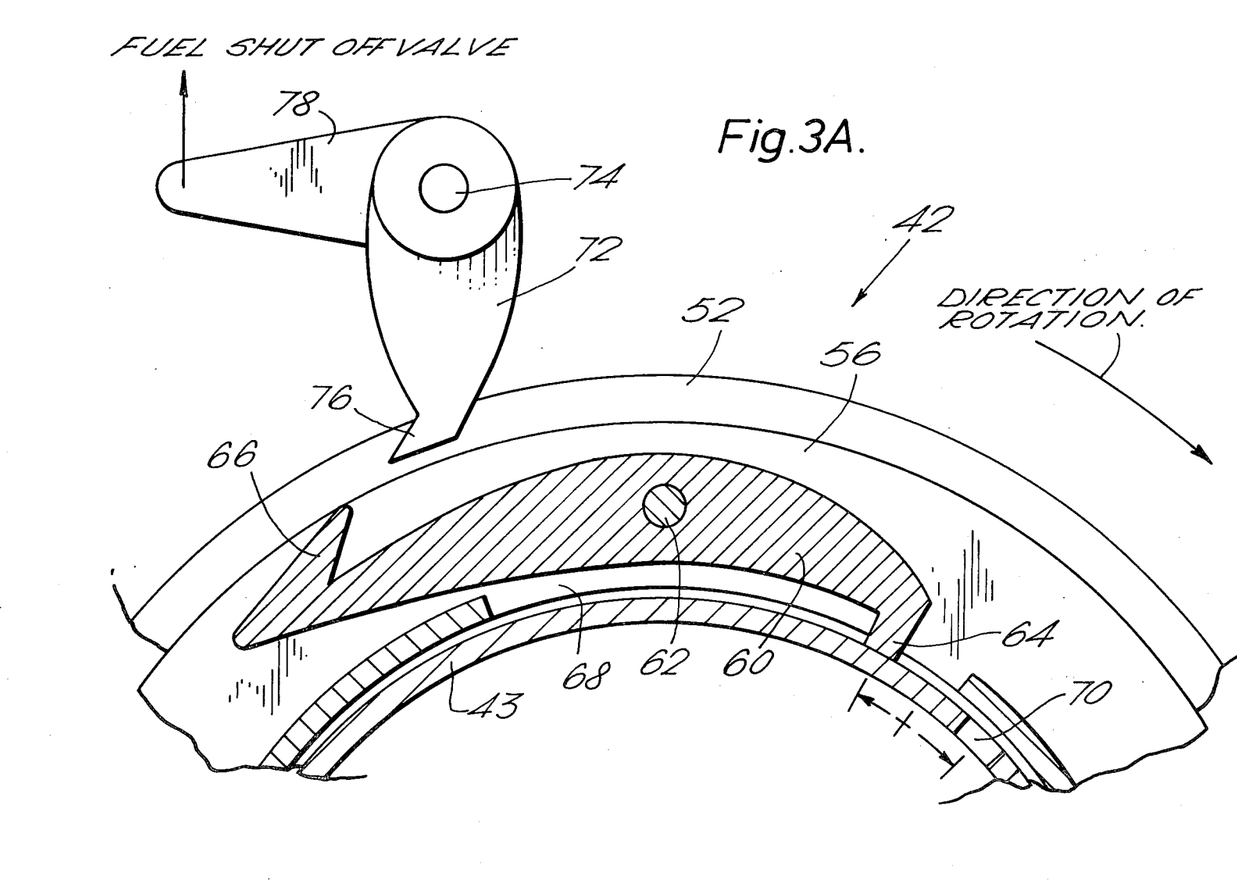
FIGS. 3A, 3B and 3C are cross-sections along the line A—A in FIG. 2 showing the operation of the ratchet device.

FIGS. 2, 3A, 3B and 3C show enlarged views of the detection means 42 and the downstream end of the shafts 36 and 38. The shaft 36 has a shaft 40 secured coaxially to its downstream end by a number of bolts 44 which extend through coaxial apertures 48 and 50 in the flanges 52 and 54 respectively of the shafts 40 and 36 respectively, and by a number of cooperating nuts 46. The shaft 38 has a sleeve 43 at its downstream end which has an outer diameter substantially the same as the inner diameter of the shaft 40, and the sleeve 43 has at least one aperture 70 in its circumference. A pair of flanges 56 and 58 respectively extend circumferentially around the shaft 40 and at least one spindle 62 extends between the flanges 56 and 58. A ratchet device 60 is mounted on the spindle 62, and an arm 64 at one end of the ratchet device 60 extends through a slot 68 in the shaft 40 and abuts the outer circumference of the sleeve 43. A pawl 66 at the other end of the ratchet device 60 extends away from the shaft 40 but not beyond the outer radius of the flanges 56 and 58. A lever 72 or a cable is spaced radially from the outer circumference of the flanges 56 and 58, and from the pawl 66 and an arm 78 of the lever 72, or the cable may be connected to a fuel shut off valve or to an indication means. In the position shown in FIG. 3A the lever 72 has not been operated and the fuel shut off valve is open and allows fuel to flow to the combustion chamber of the gas turbine engine. The lever 72 lies in the same plane as the ratchet device 60, and the aperture 70 in the sleeve 43 of the shaft 38 also lies in the same plane as the lever 72 and the ratchet device 60. When the gas turbine engine 10 is at rest the aperture 70 in the sleeve 43 is positioned a predetermined angle X in the direction of rotation of the shafts 36 and 38 from the arm 64 of the ratchet device 60 as shown in FIG. 3A. The lever 72 is mounted on a spindle 74 and is free to rotate about the spindle 74, and the lever 72 has an end 76 which is spaced radially from the outer circumference of the flanges 56 and 58.

Figure 4:
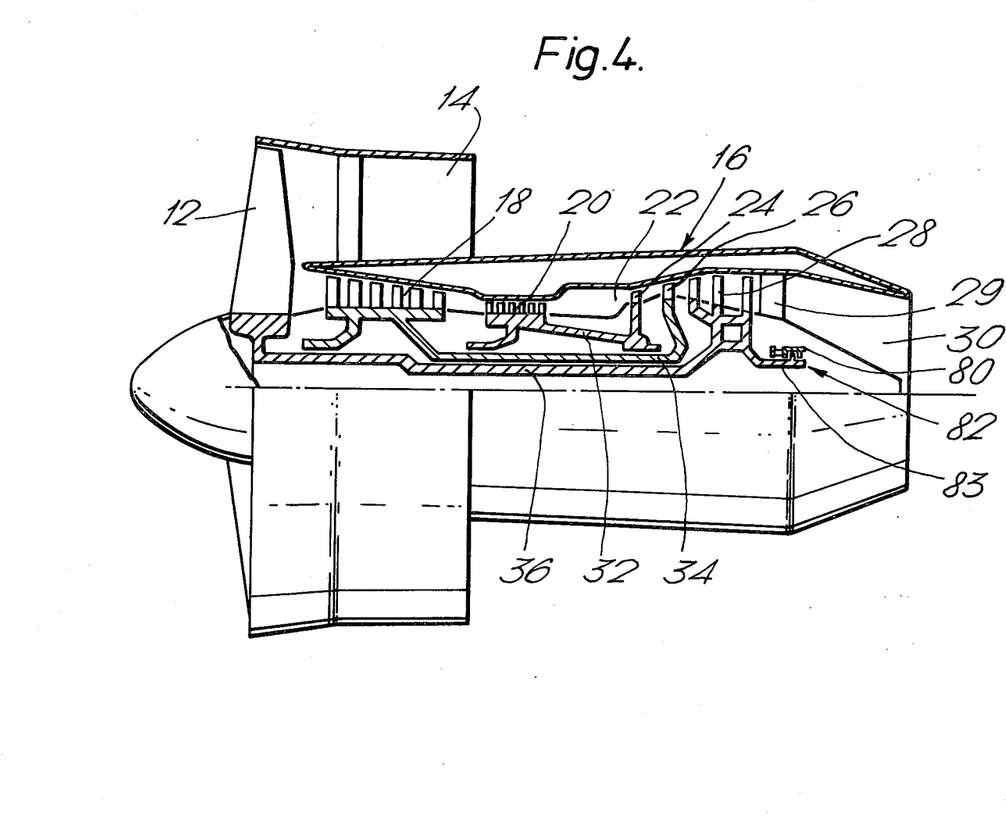
FIG. 4 is a diagrammatic view of a gas turbine engine according to the present invention which is partially cut away to show a further embodiment of the rotating assemblies, the shafts and the means to detect when a relative angular displacement between the shafts reaches a predetermined amount when the gas turbine engine is in operation.

FIG. 4 shows a gas turbine engine 10 similar to that shown in FIG. 1, but which has a shaft 80 positioned coaxially around and secured to a shaft 83 which is secured to the downstream end of the shaft 36. A detection means 82 to detect when a relative angular displacement between the shafts 36 and 80 reaches a predetermined amount when the gas turbine engine is in operation, is positioned at the downstream end of the shaft 36.

FIGS. 5, 6A, 6B and 7 show enlarged views of the further embodiment of the detection means 82 and the downstream end of the shaft 36, and shafts 83 and 80. The shaft 83 is secured coaxially to the downstream end of the shaft 36 by a number of bolts 84 which extend through coaxial apertures 88 and 90 in the flanges 92 and 94 of the shafts 83 and 36 respectively, and by a number of cooperating nuts 86. The shaft 80 has at least one limb 116 which extends radially inwards from the shaft 80 but which is spaced radially from the shaft 83. Similarly at least one limb 102 extends radially outwards from the shaft 83 but is spaced from the shaft 80. At least one weight 108 is positioned radially between the shafts 83 and 80, and the weight 108 is secured to the shafts 83 and 80 by links 104 and 112 respectively which are secured to the weight 108 by a spindle 110 and to the limbs 102 and 116 of shafts 83 and 80 respectively by spindles 106 and 114 respectively. The links 104 and 112 and the spindles 106, 110 and 114 allow the weight 108 to move in a radial direction. The limbs 102 and 116, the weight 108 and the links 104 and 112 are positioned axially between a pair of flanges 96 and 98 which extend circumferentially around the inner circumference of the shaft 80. A flange 100 is axially spaced from the flange 98 and at least one spindle 120 extends axially between the flanges 98 and 100. A ratchet device 118 is mounted on the spindle 120 and an arm 122 at one end of the ratchet device abuts the outer circumference of the shaft 83, and a pawl 124 at the other end of the ratchet device 118 extends away from the shaft 83 but not beyond the outer radius of the flange 100. The shaft 83 has at least one aperture 126 in its circumference and the aperture 126 and the ratchet device lie be in the same plane. The aperture 126 is initially positioned a predetermined angle in the direction of rotation of the shafts 83 and 80 away from the arm 122 of the ratchet device 118. A lever 128 or a cable is spaced radially outwards from the flange 100 and extends parallel to the axis of the shaft 36.

In operation air is drawn into the gas turbine engine 10 and is given an initial compression by the fan 12, and the air flow is then divided. A first portion of the air flows through the annular bypass duct 14 around the core engine 16, and a second portion of the air flow into the core engine 16. The second portion of air is further compressed by the intermediate and high pressure compressors 18 and 20 respectively before it enters the annular combustion chamber 22. Fuel is injected into the annular combustion chamber 22 and is ignited and burnt in the air to produce hot gases which flow out of the annular combustion chamber 22. The hot gases drive the high, intermediate and low pressure turbines 24, 26 and 28 respectively before leaving the gas turbine engine 10 through the nozzle 30. The high, intermediate and low pressure turbines 24, 26 and 28 respectively in turn drive the high and intermediate pressure compressors 20 and 18 and the fan 12 respectively via the shafts 32, 34 and 36 respectively.

As previously mentioned, the shafts may be rotating at speeds in excess of 11000 RPM when the gas turbine engine is in operation. If one of the shafts failed the corresponding turbine rotor or rotors would accelerate rapidly due to the removal of the load it is driving. If the acceleration of the unloaded turbine rotor or rotors is not prevented, the turbine rotor or rotors will overspeed, and the turbine rotor may burst and cause serious damage to the gas turbine engine.

Each turbine rotor is driven by the hot gases passing through the turbine, and each turbine rotor drives the corresponding shaft which in turn drives the corresponding compressor rotor. The shaft has a degree of twist between its upstream and downstream ends due to the torque applied to the shaft. If the shaft is weakened structurally the twisting of the shaft will increase. If the shaft fails the turbine rotor becomes unloaded and leads to overspeeding of the turbine rotor.

In order to prevent overspeeding of the turbine rotor, the excessive twisting of the shaft is detected before the shaft fails and the supply of fuel to the gas turbine engine can be shut off, or the excessive speed of the shaft can be detected after failure of the shaft and then the supply of fuel to the gas turbine engine can be shut off.

The detection means 42 shown in FIGS. 2, 3A, 3B and 3C may be used to detect excessive twisting of the shaft 36 before the shaft 36 fails. To detect the twisting of the shaft 36, the shaft 38 is secured coaxially within and to the upstream end of the shaft 36. The shaft 38 extends the full length of the shafts 36 and 40. As the rotational speed of the shaft 36 increases in operation, there is a twisting of the downstream end of the shaft 36 and the shaft 40 in the direction of rotation of the shaft 36 with respect to the upstream end of the shaft 36. The twisting of the shaft 36 is due to the torque applied to the shaft 36, and the twisting of the shaft 36 results in an angular dispacement between the shaft 40 and the sleeve 43 at the downstream end of the shaft 38. The or each aperture 70 in the sleeve 43 is initially positioned a predetermined angle X in the direction of rotation of the shaft 36 from the arm 64 of the ratchet device 60, as shown in FIG. 3A.

Figure 3B:
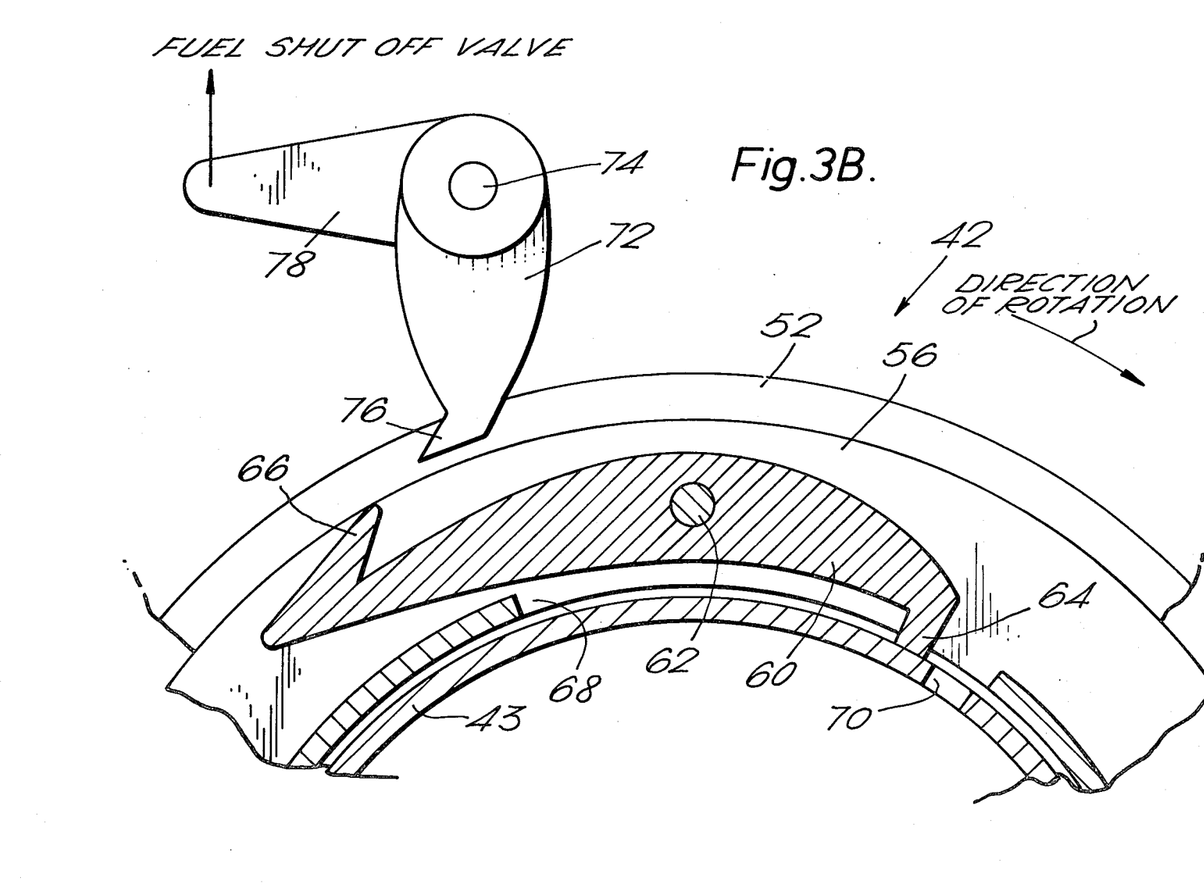

In operation, due to the twisting of the shaft 36, the arm 64 of the ratchet device 60 is displaced relative to the shaft 38 and the aperture 70. This displacement is in the direction of rotation of the shafts 36 and 38, and hence the arm 64 is displaced towards the aperture 70, as shown in FIG. 3B. The angle through which the ratchet device 60 and arm 64 is displaced is dependent upon the torque applied to the shaft 36, but the predetermined angle has been chosen to be greater than the angular displacement of the shaft 40 and the associated ratchet device 60 with respect to the shaft 38 under normal operating conditions of the gas turbine engine 10.

Figure 3C:
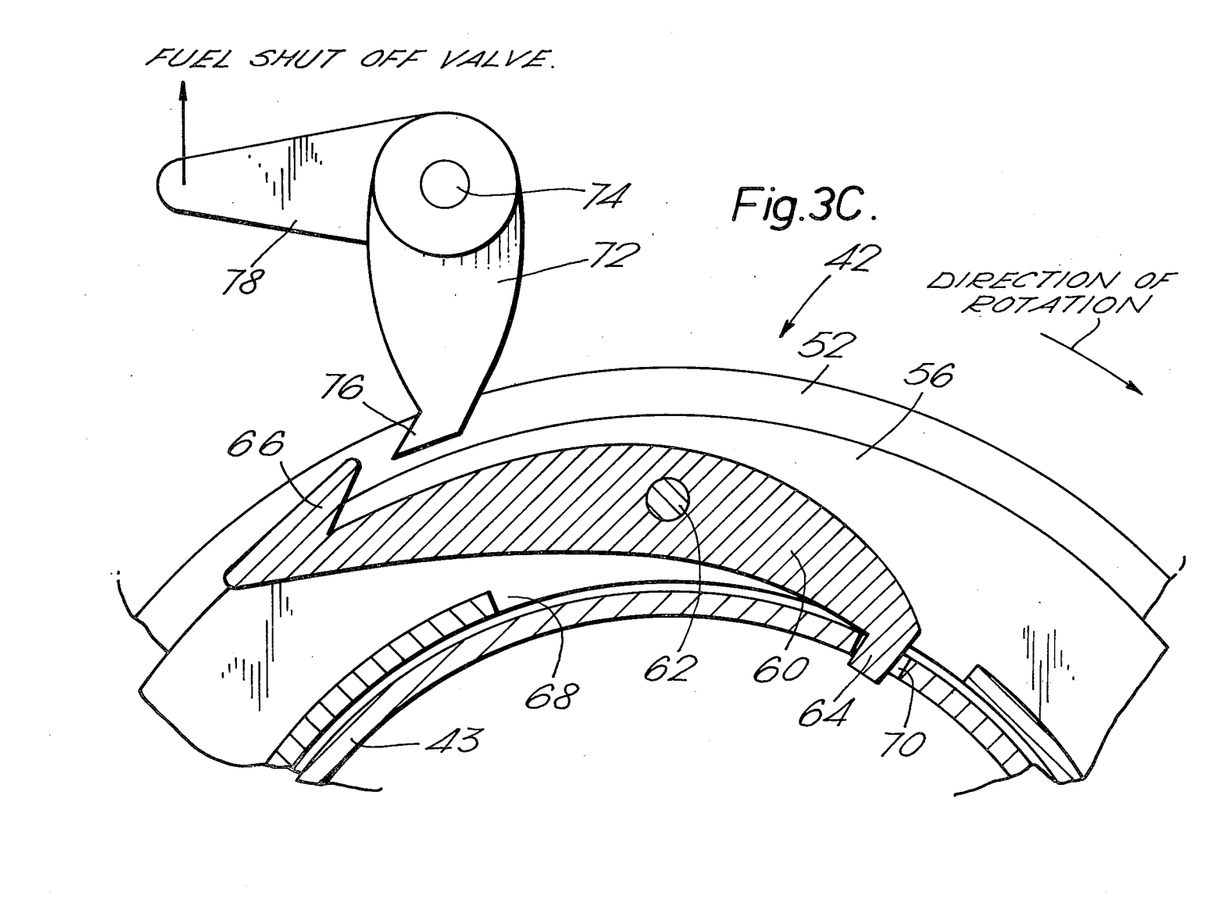

However, if for some reason, the angular displacement of the shaft 40 and the associated ratchet device 60 with respect to the shaft 38 is greater than under normal operating conditions, the arm 64 of the ratchet device 60 is displaced along the circumference of the sleeve 43 until it reaches the aperture 70 in the sleeve 43. The arm 64 of the ratchet device 60 aligns with and drops into the aperture 70 in the sleeve 43, and the ratchet device rotates about the spindle 62 and the pawl 66 moves radially outwards from the flanges 56 and 58. As the shafts 36 and 38 rotate, the pawl 66 engages with and displaces the end 76 of the lever 72 which is spaced from the flanges 56 and 58. The displacement of the end 76 of the lever 72 causes the lever 72 and arm 78 to be rotated about the spindle 74 and this operates the fuel shut off valve. The supply of fuel to the combustion chamber of the gas turbine engine is terminated and this prevents the low pressure turbine from overspeeding.

Figure 5:
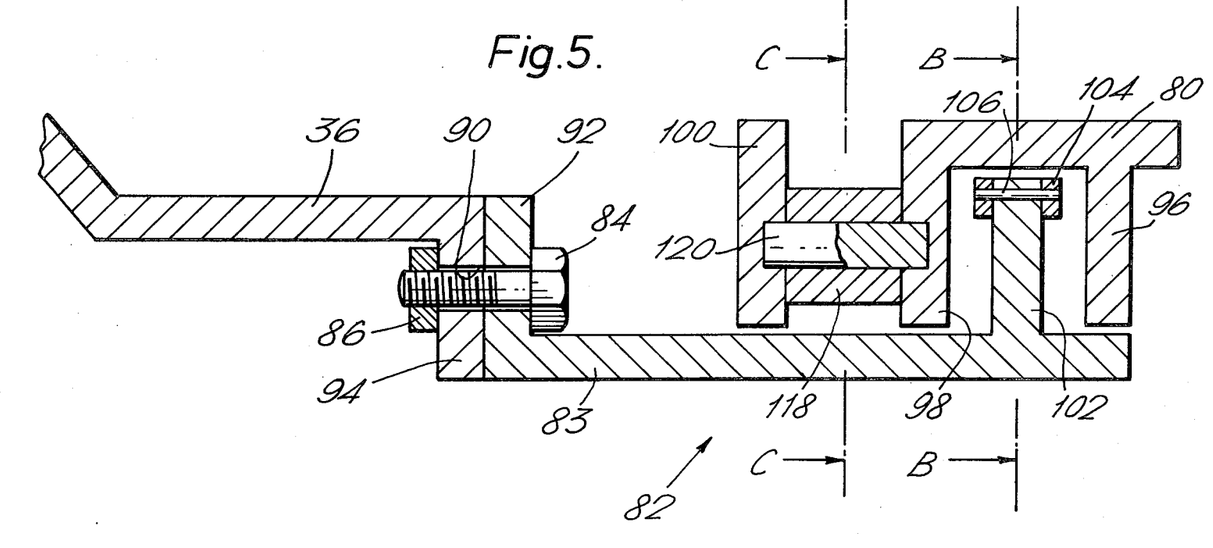
FIG. 5 is an enlarged view of the low pressure shaft and a shaft positioned coaxially around the low pressure shaft and the detecting means as shown in FIG. 4.
Figure 6A:
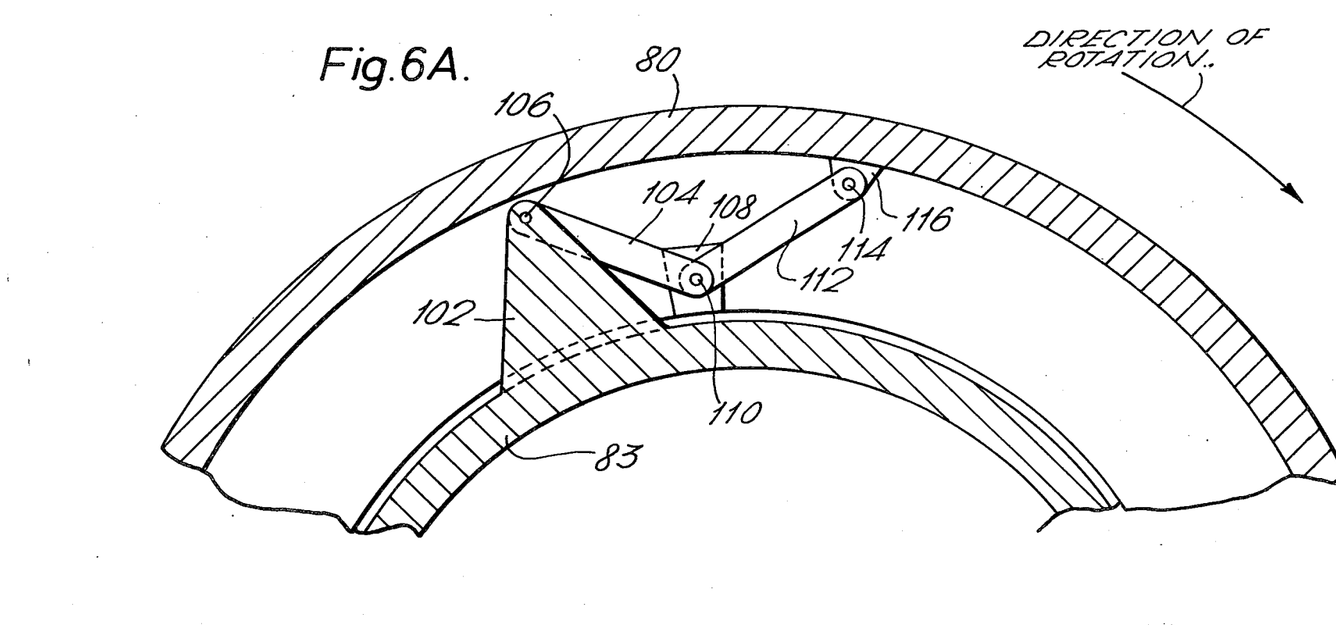
FIGS. 6A and 6B are cross-sections along the line B—B in FIG. 5 showing operation of a means to cause the shaft to be angularly displaced relative to the low pressure shaft when the gas turbine engine is in operation.

The detection means 82 shown in FIGS. 5, 6A, 6B and 7 may be used to detect excessive speed of rotation of the shaft 83 due to failure of the shaft 36. To detect excessive rotational speed of the shaft 83 the shaft 83 is secured coaxially to the downstream end of the shaft 36. The shaft 82 is attached to the shaft 83 by the links 104 and 112 which are secured to the limbs 102 and 116 on the shafts 83 and 80 respectively and to the weight 108 as shown in FIG. 6A. As the rotational speed of the shaft 36 increases in operation the centrifugal force acting on the weight 108 increases, this causes the weight 108 to move to an increased radius from the axis of the shaft 36. The movement of the weight 108 to an increased radius from the axis of the shaft 36 causes the links 104 and 112 to rotate about the spindles 106, 110 and 114 which in turn causes the shaft 80 to be angularly displaced relative to the shaft 83. The aperture 126 in the shaft 83 is initially positioned a predetermined angle in the direction of rotation of the shaft 36 from the arm 122 of the ratchet device 118.

Figure 7:
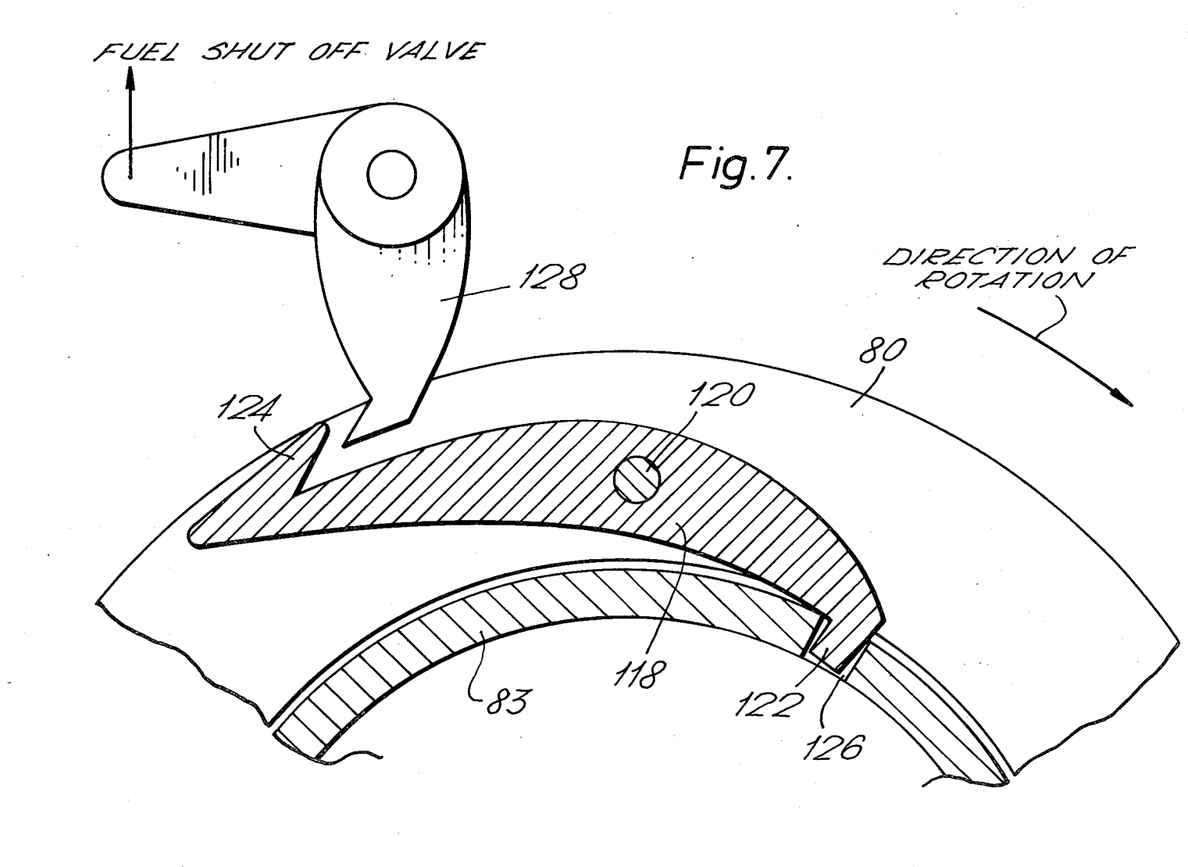
FIG. 7 is a cross-section along the line C—C in FIG. 5 showing the ratchet device.

In operation, due to the angular displacement of the shaft 80 the ratchet device 118 and its arm 122 are displaced towards the aperture 126 in the shaft 83. The angle through which the shaft 80 and the ratchet device 118 is displaced is dependent upon the rotational speed of the shaft 36, but the predetermined angle has been chosen to be greater than the angular displacement of the shaft 80 and ratchet device 118 with respect to the shaft 83 under normal operation of the gas turbine engine.

Figure 6B:
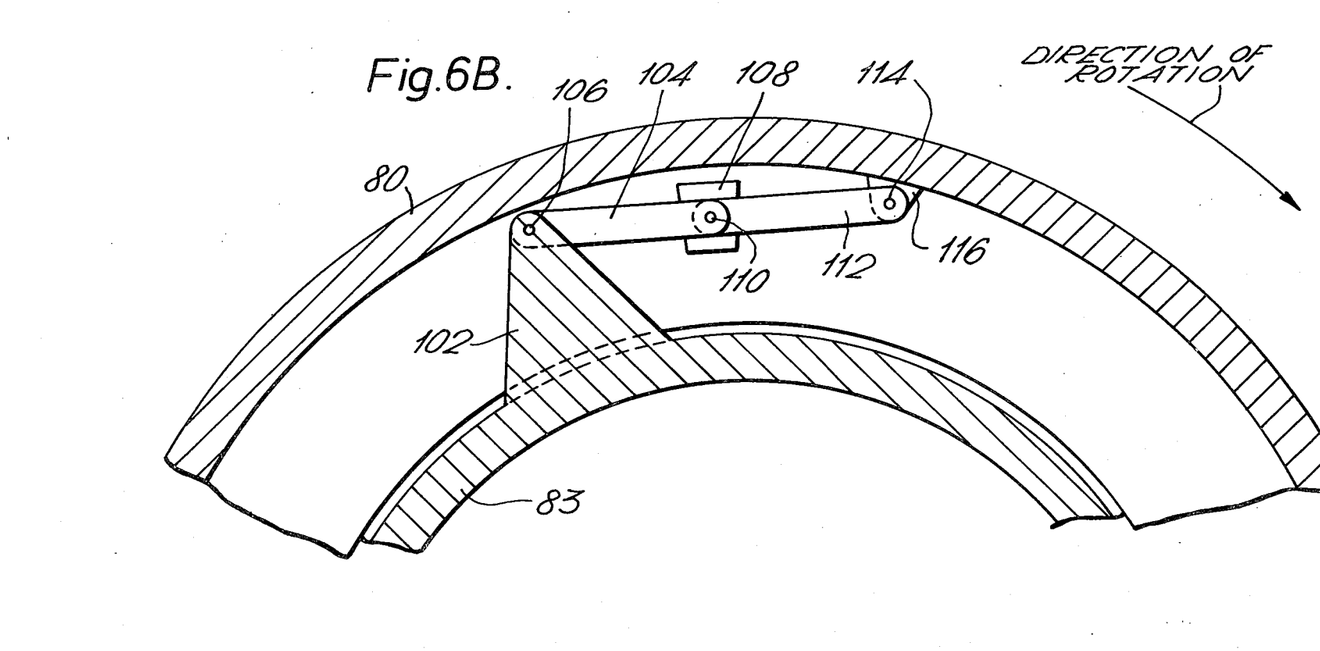

However, if the shaft 36 fails the rotational speed of the shaft 83 will increase and this causes the weight 108 to move to an increased radius as shown in FIG. 6B, this increases the angular displacement between the shaft 80 and the shaft 83. The arm 122 of the ratchet device 118 is displaced along the circumference of the shaft 83 until it aligns with and drops into the aperture 126 of the shaft 83. The ratchet device 118 rotates about the spindle 120 and the pawl 124 moves radially outwards from the flange 100. As the shaft 83 rotates the pawl 124 engages with and displaces the lever 128 which operates the fuel shut off valve.

The detection means in the embodiment shown in FIGS. 5 to 7 may be used to detect excessive rotational speeds of the low, intermediate or high pressure shafts and the ratchet device may be used to shut off the fuel supply to the gas turbine engine when the excessive rotational speeds are detected.

The embodiment shown in FIGS. 1 to 4 may be used to detect excessive twisting of the shaft 36 before the shaft 36 fails, but if a fail safe shaft is used to prevent unloading of the turbine rotor, the displacement of the lever 72 could be used to provide an indication to the flight deck of the aircraft to which the gas turbine engine is mounted that the shaft 36 was about to fail, instead of terminating the fuel supply to the combustion chamber of the gas turbine engine.

In the embodiments shown only one aperture and cooperating ratchet device has been depicted, but it may be necessary to use several equi-spaced apertures and cooperating ratchet devices in order to reduce the time period from when the arms move into the apertures, to when a pawl displaces the lever or cable and operates the fuel shut off valve.

The levers 72 may cause the fuel supply to be shut off using a cable or by use of hydraulic pressure or other means. The cable or piping may be taken through the hollow struts 29 from the lever 72 or cable 128 to the fuel shut off valve.

A cable may be positioned radially outwards from the pawl of the ratchet devices instead of the lever devices. These cables would extend parallel to the axis of the shaft.

I claim:

1. A gas turbine engine which comprises a first shaft positioned coaxially within a second shaft, one of the shafts drivingly connecting a first rotating asssembly to a second rotating assembly, and a means to detect when a relative angular displacement between the shafts reaches a predetermined value while the gas turbine engine is in operation, said means comprising at least one aperture in the first shaft and a corresponding ratchet device mounted on a spindle which is attached to the second shaft, the ratchet device having an arm positioned at one end which abuts the circumference of the first shaft; the aperture in the first shaft lying in the same plane as the ratchet device and positioned at a pre-determined angle in the direction of rotation of the shafts from the arm of the ratchet device; in operation when the relative angular displacement between the first and second shafts reaches the pre-determined value the arm of said ratchet device aligns with and moves into said aperture.

2. A gas turbine engine as claimed in claim 1 in which the first shaft has a plurality of equi-spaced apertures and the second shaft has an equal number of equi-spaced ratchet devices mounted on spindles, the apertures in the first shaft and the ratchet devices lying in the same plane and each aperture in the first shaft being positioned a predetermined angle in the direction of rotation of the shafts from the arm of a corresponding ratchet device; in operation when the relative angular displacement between the first and second shafts reaches the predetermined value the arm of each ratchet device aligns with and moves into the corresponding aperture in the first shaft.

3. A gas turbine engine as claimed in claim 2 in which the second shaft drivingly connects the first rotating assembly to the second rotating assembly, the first shaft extends the full length of the second shaft and the first shaft is secured to the upstream end of the second shaft, the apertures in the first shaft and the corresponding ratchet devices are positioned at the downstream end of the first and second shafts respectively; in operation the twisting of the second shaft causes the downstream end of the second shaft to be angularly displaced relative to the downstream end of the first shaft.

4. A gas turbine engine as claimed in claim 2 in which the first shaft drivingly connects the first rotating assembly to the second rotating assembly, at least one weight being positioned radially between and attached to the first and second shafts respectively; the weight is attached to the first and second shafts by a pair of links which allow the weight to move in a radial direction; in operation the weight moves radially outwards and causes the second shaft to be angularly displaced relative to the first shaft.

5. A gas turbine engine as claimed in claim 1, in which each ratchet device has a pawl positioned at the opposite end to the arm, an operating means being spaced radially outwards from the pawl; in operation when the arm of each ratchet device moves into the corresponding aperture in the first shaft each ratchet device rotates about its spindle and each pawl moves radially outwards and as the shafts rotate one of the pawls engages with and causes displacement of the operating means.

6. A gas turbine engine as claimed in claim 5 in which a fuel supply is arranged to supply fuel to the gas turbine engine, the displacement of the operating means causing the supply of fuel to the gas turbine engine to be at least reduced.

7. A gas turbine engine as claimed in claim 6 in which the displacement of the operating means causes the supply of fuel to the gas turbine engine to be terminated.

8. A gas turbine engine as claimed in claim 5 including a means to indicate that the relative angular displacement between the shafts has reached the predetermined value, the displacement of the operating means causing the operation of the indication means.

9. A gas turbine engine as claimed in claim 5 in which the operating means is a lever or a cable.

10. A gas turbine engine as claimed in claim 2, in which each ratchet device has a pawl positioned at the opposite end to the arm, an operating means being spaced radially outwards from the pawl; in operation when the arm of each ratchet device moves into the corresponding aperture in the first shaft each ratchet device rotates about its spindle and each pawl moves radially outwards and as the shafts rotate one of the pawls engages with and causes displacement of the operating means.

11. A gas turbine engine as claimed in claim 3, in which each ratchet device has a pawl positioned at the opposite end to the arm, an operating means being spaced radially outwards from the pawl; in operation when the arm of each ratchet device moves into the corresponding aperture in the first shaft each ratchet device rotates about its spindle and each pawl moves radially outwards and as the shafts rotate one of the pawls engages with and causes displacement of the operating means.

12. A gas turbine engine as claimed in claim 4, in which each ratchet device has a pawl positioned at the opposite end to the arm, an operating means being spaced radially outwards from the pawl; in operation when the arm of each ratchet device moves into the corresponding aperture in the first shaft each ratchet device rotates about its spindle and each pawl moves radially outwards and as the shafts rotate one of the pawls engages with and causes displacement of the operating means.

* * * * *